W. C. THIELL.
AUTOMOBILE LOCK.
APPLICATION FILED JULY 13, 1920.

1,427,654.

Patented Aug. 29, 1922.

Inventor:
William C. Thiell
By Chapin A. Ferguson
Attorney

UNITED STATES PATENT OFFICE.

WILLIAM C. THIELL, OF BALTIMORE, MARYLAND.

AUTOMOBILE LOCK.

REISSUED

1,427,654.    Specification of Letters Patent.    Patented Aug. 29, 1922.

Application filed July 13, 1920.  Serial No. 395,818.

*To all whom it may concern:*

Be it known that I, WILLIAM C. THIELL, a citizen of the United States, residing at Baltimore, in the State of Maryland, have invented certain new and useful Improvements in Automobile Locks, of which the following is a specification.

This invention relates to improvements in automobile locks and has for its object to provide a cheap, simple and efficient device to lock the machine so that it cannot be started and also to lock the machine so it cannot be towed away.

The invention consists of the novel construction and arrangement of the parts hereinafter more fully set forth in the specification and pointed out in detail in the appended claim.

In the accompanying drawing:—

Figure 1:
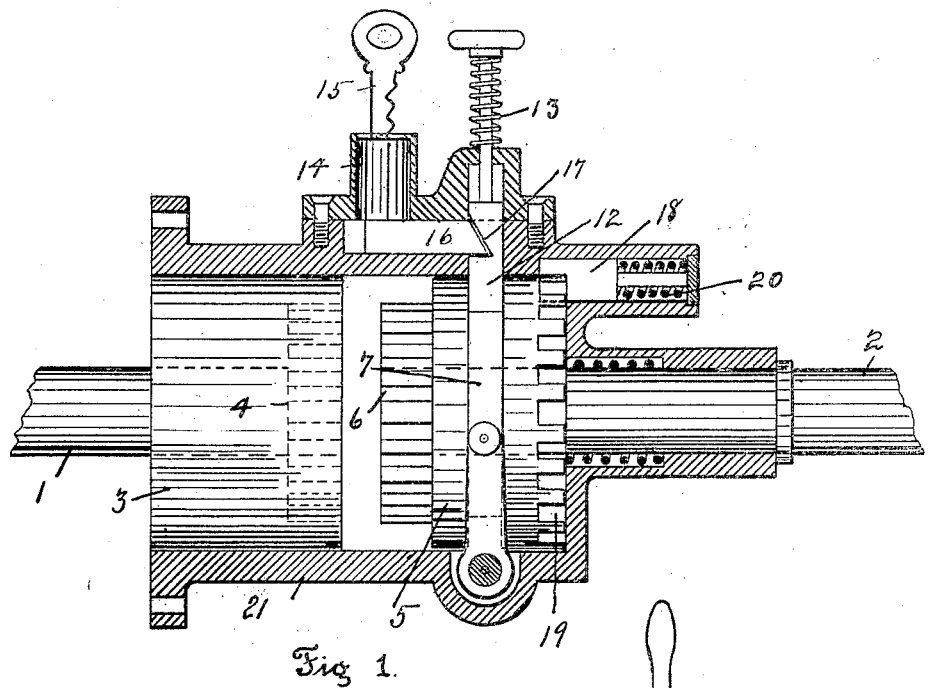
Figure 1 is a side elevation of my invention, the clutch casing being shown in section.
Figure 2:
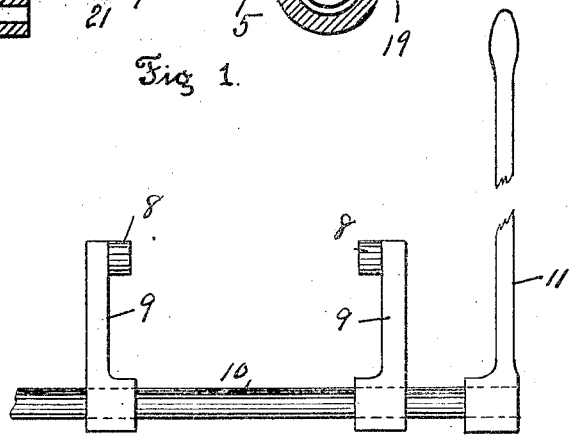
Figure 2 is a detail view of the lever and shaft for operating the slidable clutch face.

Referring to the accompanying drawings forming part of this specification and in which like reference numerals designate like parts throughout the several views thereof, 21 designates the clutch casing through which the driver shaft projects. The said driver shaft is composed of two sections 1 and 2 the section 1 being connected with the engine in the front of the machine and the section 2 being connected with the rear of the machine. The front section 1 is provided with a clutch face 3 which is provided with internal gears 4 and is fast on the end of the section 1 of said drive shaft. The other face 5 of the clutch is slidably mounted on the end of the section 2 of the drive shaft and is provided with external teeth 6 adapted to mesh with the internal teeth on the face 3 of the clutch. The said clutch 5 is provided with an annular groove 7 into which is fitted the rollers 8 on the arms 9, the latter being mounted on the shaft 10 which is operated by the lever 11 for moving the slidable face 5 into and out of gear with the clutch face 3. The case 21 is provided with a bolt 12 adapted to be forced into the annular groove 7 of the clutch face 5, the said bolt 12 being held normally out of engagement with said slot 7 by the spring 13. The casing 21 is also provided with a lock 14 operated by the key 15, the latch 16 of said lock being bevelled on one end and adapted to be set in the bevelled cut-out 17 in the side of the bolt 12. When the device is in the unlocked position the bolt 12 is out of engagement with the groove 7 and the face 5 can be moved back and forth on the section 2 of the drive shaft by operating the lever 11. When it is desired to lock the machine the clutch face 5 is drawn back out of engagement with the clutch face 3 and the bolt 12, is then pushed down against the action of the spring 13 into the groove 7 and the latch 16 springs into the recess 17 in which position the bolt will be held and the clutch face 5 locked against movement along the section 2 of the drive-shaft in which position the machine cannot be operated until the latch 16 is withdrawn from the recess 17 by means of key 15. The rear end of the case 21 is provided with a sliding bolt 18 adapted to engage one of the cut-outs 19 on the rear of the clutch face 5, the said bolt 18 being held in the normal position by the coil spring 20. When the clutch face 5 is drawn out of engagement with the clutch face 3 the pin 18 will enter one of the cut-outs 19 and prevent the rear section 2 of the drive shaft from being turned which locks the rear wheels of the machine and prevents it from being towed away. As the clutch face 5 is moved forward it will not engage the face 3 until the rear end has completely passed the end of the bolt 18. Should the space on the rear of the clutch face 5 between the cut-outs 19 strike the end of the bolt 18 the latter will be pushed back against the action of the coil spring 20 and any attempt to move the car will cause sufficient revolution of the section 2 of the drive shaft to allow the said bolt to spring into one of the cut outs 19.

It will thus be seen that by the use of my invention the machine can be locked or so operated so that it cannot be started and that the rear of the machine is so locked that it cannot be towed away.

Having thus described my invention what I claim is:

An automobile lock comprising a clutch casing, a drive shaft comprising two sections each projecting into said clutch casing, a clutch face fixed to the end of one of the sections of said drive shaft and having internal gear teeth, a clutch face slidably mounted on the other section of said drive shaft and having an annular recess therein and external gear teeth, a shaft mounted in said casing at right angles to the drive shaft and having two arms projecting therefrom, a roller on the end of each of said arms and projecting into said recess in the slidable clutch face, a lever to operate said last named shaft to throw the slidable clutch face into or out of engagement with the other clutch face, a bolt adapted to project into the recess in the slidable clutch face, a spring to hold the said bolt normally out of engagement with the slidable clutch face, and a lock to hold the bolt in the slidable clutch face.

In testimony whereof I affix my signature.

WILLIAM C. THIELL.